Patented May 13, 1924.

1,494,011

UNITED STATES PATENT OFFICE.

WESLEY G. NICHOLS, OF CHICAGO HEIGHTS, ILLINOIS, ASSIGNOR TO AMERICAN MANGANESE STEEL COMPANY, OF CHICAGO, ILLINOIS, A CORPORATION OF MAINE.

METHOD OF MELTING MANGANESE STEEL.

No Drawing. Application filed December 7, 1922. Serial No. 605,512.

*To all whom it may concern:*

Be it known that I, WESLEY G. NICHOLS, a citizen of the United States, residing at Chicago Heights, in the county of Cook and State of Illinois, have invented certain new and useful Improvements in Methods of Melting Manganese Steel, of which the following is a specification.

This invention relates to the melting of manganese steel scrap for casting into manganese steel objects, and has for its purpose to greatly reduce the loss of manganese in the process of melting the steel scrap.

The increased availability of manganese steel scrap as a commercial product, and the relatively high cost of obtaining manganese steel by the addition of ferro-manganese, have combined to render very important the discovery of economical methods in the remelting of manganese steel without excessive loss of its manganese content. Important advances toward this end have been made, in the adoption of the electric furnace with its relatively inert atmosphere; in the method of conducting the heat which reduces to a minimum the duration of time when the bath is at critical temperature, before drawing the charge; and in special attention given to the chemical constituency of the protective slag which covers the bath. But notwithstanding these precautions, helpful as they are, the loss of manganese from remelted manganese steel as practiced before my present invention has been excessive and in the experience of some foundries has even discouraged the practice of melting manganese steel scrap and induced a return to the practice of combining ferro-manganese with low carbon steel by depositing it into the ladle at the time of drawing the heat. Nor can the excessive loss of manganese from manganese steel scrap be satisfactorily compensated by the addition of ferro-manganese to the melted scrap because of the excessive carbon constituent in the ultimate manganese steel resulting from the addition of the carbon unavoidably present in the ferro-manganese to that already present in and remaining with the steel scrap.

The loss of manganese from melted scrap, of course, occurs by the process of oxidation. This has been satisfactorily controlled in the body of the bath by the use of a basic bottom lining and by care in building up the protective blanket of slag. But the loss resulting from the passage of manganese oxide into the slag has not heretofore been satisfactorily prevented for the reason that in spite of efforts to maintain basic conditions in the slag, combining of the readily oxidizable manganese has taken place, and in spite of the use of carboniferous reagents upon the slag, the manganese has become irretrievably incorporated therein.

Now, the present invention avoids the difficulties recited and provides a method whereby manganese steel scrap can be successfully and economically melted for re-use as manganese steel, and a steel of great purity and high physical character obtained. The underlying feature of the invention consists in melting steel containing manganese, in a furnace that is not only rendered as basic and as free from oxygen-bearing environment as practicable, but is provided with a readily oxidizable ingredient at the level of and preferably also above the slag that takes up the oxygen of the slag or that contained in acid or other oxidizing influences thereof, and leaves the slag more nearly neutral and the greater portion of manganese which enters the slag free to return to the bath.

The readily oxidizable ingredient is preferably iron in metallic form, but it may be any metalliferous substance having a sufficient affinity for oxygen and not incompatible with the desired formula of the bath.

Again, the metal or metalliferous ingredient is preferably incorporated in the lining of the furnace and particularly that part of the lining which surrounds and lies above the slag. The roof also will preferably be lined with basic material, although not necessarily with metalliferous material.

A convenient method of bringing metal into the described relation to the slag covering of a bath of manganese steel in an electric arc furnace is to line the furnace or at least those parts of the furnace which are critical to the present process, with material commercially known as "metalkase" brick, which consists of a sheet metal jacket of approximately rectangular section filled with magnesite (lime and magnesia), in such a manner that the edges of the sheet metal jackets are exposed to the heat of the furnace, and melt and run down into the slag in quantity sufficient to neutralize the oxidizing influence in the slag. But the result may also be obtained, at least to a measurably beneficial degree, by otherwise incorporating iron in metallic state with the lining brick.

The effect of the iron clad brick or brick otherwise associated with the iron is not merely that incident to the basic nature of the lining thus insured; it is not to insure neutrality in the effect of the lining, but to lend a positively reactive element at and above the level of the slag.

I claim:

1. The improvement in the art of melting manganese steel scrap to produce manganese steel castings, which consists in subjecting the steel scrap to fusing temperature in a relatively inert environment and under the protection of a covering of slag, while providing at or above the level of the slag a readily oxidizable metalliferous substance not incompatible with the formula of the bath.

2. The improvement in the art of melting manganese steel scrap, and conserving therein the contained manganese, the same consisting in subjecting the manganese steel scrap to fusing temperature in an air-excluding furnace, and under the protection of a covering of slag, while providing iron at or above the level of the slag.

3. The improvement in the art of melting manganese steel scrap to produce manganese steel castings, the same consisting in subjecting the steel scrap to fusing temperature with exclusion of atmosphere, and while beneath a protective covering of slag, and surrounded by a wall composed in part of iron exposed upon the inner surface of the wall.

Signed at Chicago, Illinois, this 29th day of November, 1922.

WESLEY G. NICHOLS.